United States Patent [19]

Takanashi

[11] Patent Number: 4,645,445

[45] Date of Patent: Feb. 24, 1987

[54] INJECTION DEVICE OF INJECTION MOLDING MACHINE

[75] Inventor: Yukio Takanashi, Numazu, Japan

[73] Assignee: Toshiba Kikai Kabushiki Kaisha, Tokyo, Japan

[21] Appl. No.: 689,960

[22] Filed: Jan. 9, 1985

[30] Foreign Application Priority Data

Jan. 12, 1984 [JP] Japan ..................... 59-4065

[51] Int. Cl.⁴ ............... B29C 45/03; B29C 45/50
[52] U.S. Cl. .................................. 425/208; 366/89; 366/323; 425/542
[58] Field of Search ............... 425/207, 208, 202, 542; 366/89, 88, 323

[56] References Cited

U.S. PATENT DOCUMENTS

| | | | |
|---|---|---|---|
| 3,653,637 | 4/1972 | Eckhardt | 366/89 |
| 3,728,053 | 4/1973 | Stillhard et al. | 425/208 |
| 3,826,477 | 7/1974 | Kunogi et al. | 425/208 |
| 3,932,086 | 1/1976 | Kasamatsu | 425/208 |

FOREIGN PATENT DOCUMENTS 154464 12/1979 Japan .................. 425/208

Primary Examiner—Barry S. Richman
Assistant Examiner—Joye L. Woodard
Attorney, Agent, or Firm—Stevens, Davis, Miller & Mosher

[57] ABSTRACT

An injection device of an injection molding machine generally comprises a heating cylinder, a screw member disposed therein, and a drive system for driving the screw member. The heating cylinder is provided at its front end with a cylinder head comprising a first portion having an inner frustoconical configuration and being continuous to the front end of the heating cylinder and a second portion being continuous to the first portion and having an inner diameter smaller than that of the heating cylinder. The inner surfaces of the heating cylinder, the first and second portions of the cylinder head are connected linearly smoothly with each other. The screw member consisting of a first screw portion having outer diameter slightly smaller than the inner diameter of the heating cylinder, a second screw portion having outer diameter slightly smaller than the inner diameter of the first portion of the cylinder head, and a third screw portion having an outer diameter slightly smaller than the inner diameter of the second portion of the cylinder head.

6 Claims, 1 Drawing Figure

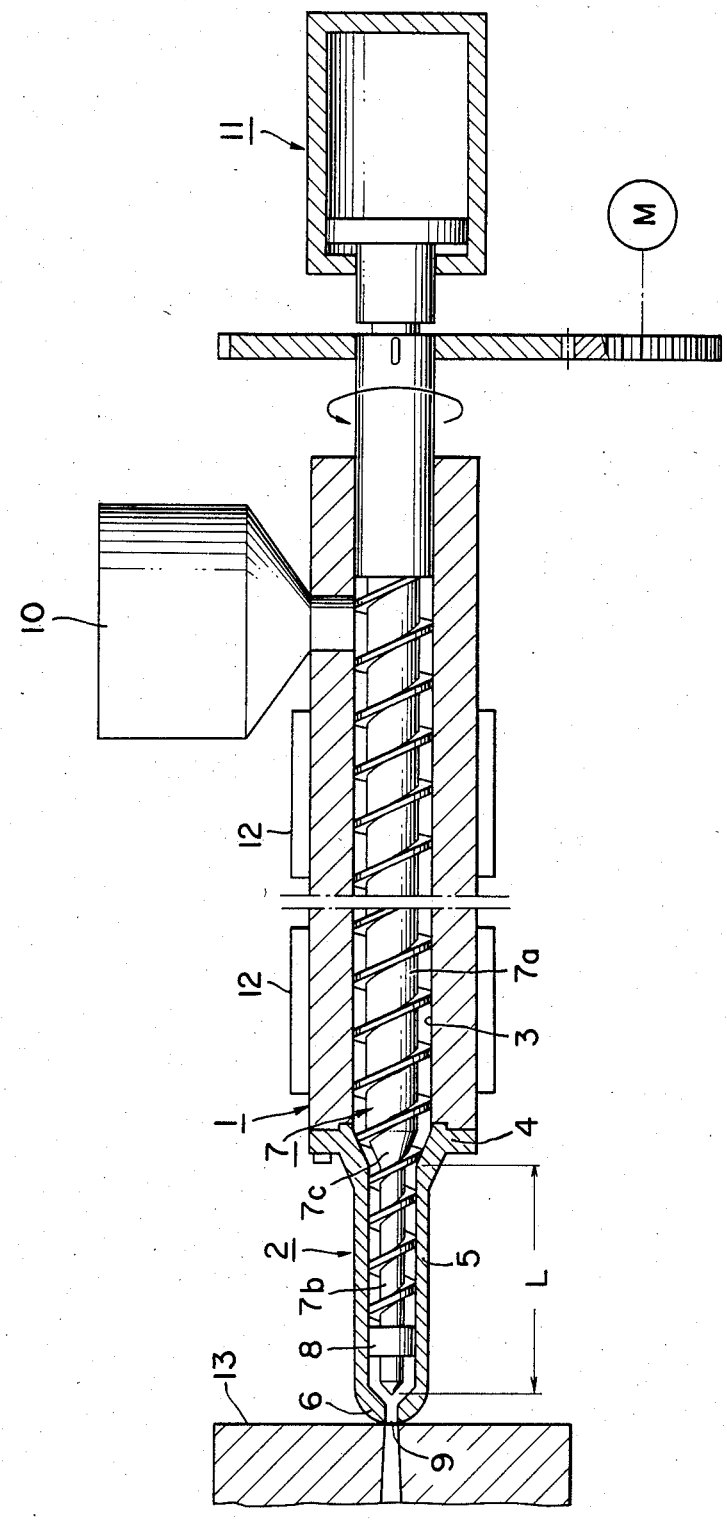

INJECTION DEVICE OF INJECTION MOLDING MACHINE

BACKGROUND OF THE INVENTION

This invention relates to an injection device of an injection molding machine, and more particularly, to a high pressure injection molding device for carrying out high precision molding operations.

In a usual injection molding operation, the injection operation is carried out with the maximum pressure of about 1400–1800 Kg/cm² during a material injection process and a pressure maintaining process after the injection process. However, recently, a high pressure injection molding has been performed with an increased injection pressure of about 2500–3500 Kg/cm² thereby to obtain mold products of excellent qualities each provided with less weld lines or marks and less irregularly recessed portions on the surface of the mold product due to shrinkage of the injected material in a mold.

With the conventional high pressure injection molding operation, the high injection pressure has been obtained by a method of (a) reducing a diameter D of a screw means of the injection device, (b) increasing a diameter of a piston of an injection hydraulic cylinder assembly, or (c) increasing a hydraulic pressure of a hydraulic drive source. In the injection molding operation, the maximum injection pressure $P_{max}$ is obtained by the following equation.

$$P_{max} = \frac{P_0}{\frac{\pi}{4} D} \quad (1)$$

where $P_0$ represents an injection pressure of a hydraulic piston-cylinder assembly of the injection device and D designates a diameter of the screw of the injection device, thus the maximum pressure $P_{max}$ being in inverse proportion to the square of the screw diameter D.

Moreover, the maximum injection amount $W_{max}$ of a material and the maximum injection ratio $Q_{max}$ are represented as follows.

$$W_{max} = \frac{\pi}{4} D^2 \times S \times \gamma \cdot \eta \quad (2)$$

where S is an injection stroke of a piston rod of the hydraulic piston-cylinder assembly, $\gamma$ is a density of the material, and $\eta$ is an injection efficiency.

$$Q_{max} = \frac{\pi}{4} D^2 \times V \quad (3)$$

where V is an injection speed of the piston rod.

As is found from these equations (2) and (3), the maximum injection amount $W_{max}$ and the maximum injection rate $Q_{max}$ are both in proportion to the square of the screw diameter D.

Accordingly, from these equations (1) through (3), it will be found that with the method (a), described hereinbefore, the maximum injection pressure $P_{max}$ is increased by reducing the screw diameter D, i.e. heating cylinder, which adversely results in decreasing of the injection amount and the injection ratio. Thus, the plasticizing capability and the injection ratio are lowered thereby to reduce the product manufacturing efficiency, thus being uneconomical. Regarding the method (b), there are the same defects or problems as those mentioned with respect to the method (a) because the maximum injection pressure $P_{max}$ is increased in proportion to the square of the diameter of the piston of the hydraulic piston-cylinder assembly of the injection device, but the maximum injection ratio $Q_{max}$ is decreased in inverse proportion to the square of the diameter of the piston. Regarding the method (c), the maximum pumping pressure of a usual high precision vane pump is about 140–150 Kg/cm² or that of a usual piston pump is about 190–210 Kg/cm², so that a hydraulic apparatus having an increased pumping capacity or piping elements having enlarged sizes are required in order to obtain the extremely increased maximum pumping pressure of the hydraulic source. These facts result in an increase of the constructional cost of the injection molding machine, and in addition, the maintenance of the hydraulic circuit is made extremely difficult and the electric power consumption is inevitably increased for operating the hydraulic source.

Accordingly, as described hereinbefore, the conventional methods for obtaining the high injection pressure for the injection device have various defects or problems for obtaining the desired high injection pressure with the high efficiency and the economical advantage.

SUMMARY OF THE INVENTION

An object of this invention is to eliminate defects or disadvantages encountered with a conventional injection device of an injection molding machine, and to provide an improved injection device capable of performing a high pressure injection molding operation without lowering the plasticizing capability of the injection device.

According to this invention, in order to achieve this and other objects, there is provided an injection device of an injection molding machine of the type comprising a heating cylinder in which a material to be injected is fed, screw means disposed in the heating cylinder to feed the material forwardly, and drive means for driving the screw means, and the injection device is characterized in that a front end of the heating cylinder, downstream side thereof with respect to the material feed direction, is formed as a cylinder head which comprises a first portion continuously formed at the rear portion thereof with the front end of the heating cylinder and having a frustoconical inner configuration and a second portion continuously formed at the rear portion to the front portion of the first portion of the cylinder head and having an inner diameter smaller than that of the heating cylinder, the inner surfaces of the heating cylinder and the first and second portions of the cylinder head being connected linearly smoothly with each other, and that the screw means consists of a first screw portion having an outer diameter smaller than the inner diameter of the heating cylinder, a second screw portion having an outer diameter smaller than an inner diameter of the first portion of the cylinder head, and a third screw portion having an outer diameter smaller than an inner diameter of the second portion of said cylinder head.

BRIEF DESCRIPTION OF THE DRAWING

The accompanying single drawing shows a longitudinal section of an essential part of an injection molding apparatus including an injection device according to this invention.

DESCRIPTION OF THE PREFERRED EMBODIMENT

The drawing shows an essential part constituting an injection device of an injection molding machine according to this invention. The injection device comprises a heating cylinder 1 into which a material such as a resin is fed through a hopper 10, screw means 7 located in the heating cylinder 1 for plasticizing the material resin and feeding it forwardly, a hydraulic piston-cylinder assembly 11 for reciprocating the screw 7 and a driving motor for rotating the screw 7. Heating means such as heaters 12 are disposed around the heating cylinder 1 at several portions for heating the cylinder 1 and melting the material resin fed therein.

A cylinder head 2 is attached to the front end, left side end as viewed in the drawing, of the heating cylinder 1. The cylinder head 2 comprises a rear portion 4 having a frustoconical shape in longitudinal section, a central cylindrical portion 5 and a front portion 6 at which a nozzle hole 9 is formed. The inner diameter of the frustoconical portion 4 on the upstream side with respect to a flow direction of the molten resin in the heating cylinder 1 is formed to be substantially the same as the inner diameter of the heating cylinder so as to smoothly connect the frustoconical portion to the inner surface 3 of the heating cylinder 1. The inner diameter of the frustoconical portion 4 on the downstream side with respect to the flow direction of the molten resin is formed to be substantially the same as the inner diameter of the central portion 5 of the cylinder head 2, the inner hollow portion of the central portion 5 being axially in parallel with the inner hollow portion of the heating cylinder and the inner diameter thereof being smaller than that of the heating cylinder 1.

The central cylindrical portion 5 has a longitudinal length L which is predetermined so that a front endmost portion of the screw 7, described in detail hereinafter, remains in the cylindrical portion 5 when the screw is moved to the backward limit position in the heating cylinder 1 for preventing the molten resin in the cylindrical portion 5 from flowing backwardly.

The screw 7 disposed in the inner hollow portion of the heating cylinder 1 is reciprocated and rotated by the operations of the hydraulic piston-cylinder assembly 11 and the driving means M. The screw 7 is reciprocated in the axial direction of the heating cylinder 1 so that the screw 7 can be reciprocated in the heating cylinder 1 and the cylinder head 2 with a slight gap between the outer surface of the screw 7 and the inner surfaces of the heating cylinder 1 and the cylinder head 2, and that the length of the front screw portion does not exceed the length L when the screw 7 is fed to the advancing limit position. In other words, in detail, the screw 7 comprises three portions having different outer diameters, i.e. a large diameter portion 7a having the outer diameter substantially corresponding to the inner diameter of the hollow heating cylinder 1, a small diameter portion 7b having the outer diameter substantially corresponding to the inner diameter of the hollow cylinder head portion 5, and a frustoconical portion 7c having outer configuration or diameters substantially corresponding to the inner configuration or diameters of the frustoconical portion 4 of the cylinder head 2. These screw portions 7a, 7b and 7c are constructed so that the outer configurations thereof accord with their corresponding portions of the heating cylinder 1 and the cylinder head 2 when the screw 7 is fed to its forwardmost position as shown in the drawing. These screw portions can be integrally constructed as one part and, of course, separately formed as three parts which are then assembled into one part. Near the front end portion of the small diameter screw portion 7b is disposed a check valve 8 for preventing the molten resin in the cylinder head 2 from flowing backwardly at the injection time. The check valve 8 may be eliminated for the type of the material to be used for the injection molding operation.

The injection device according to this invention will be operated in the manner described hereinbelow.

The resin fed into the heating cylinder 1 through the hopper 10 is heated and plasticized therein by the reciprocating and rotating operations of the screw 7 through the operations of the hydraulic piston-cylinder assembly 11 and the driving means M. The molten resin plasticized in the heating cylinder 1 is then fed into and once stored in the cylinder head 2 by the predetermined amount substantially corresponding to the amount necessary for one shot of the injection device suitable for molding a product into a mold 13 which is connected to the nozzle portion 9 of the cylinder head 2. After the completion of storing the necessary amount of the molten resin in the cylinder head 2, the screw 7 is again rotated and advanced forwardly, leftwardly as viewed in the drawing, thereby to inject the molten resin into the mold 13 through the nozzle portion 9 formed at the front end portion 6 of the cylinder head 2. With this operation, the injection pressure is highly increased because the inner diameter of the cylinder head 2 is formed to be smaller than that of the heating cylinder 1.

For example, when the diameter of the screw portion 7b is formed to be 5/7D of the diameter D of the screw portion 7a, the injection pressure P is increased to be $P_{max} \approx 1.96 P_0$ in accordance with the equation (1).

According to the injection device of this invention, since the plasticizing process of the resin is carried out in the heating cylinder 1, i.e. large diameter portion of the screw 7, the plasticizing capability is not lowered or maintained as usual so that there is no need of providing specific hydraulic pumping means and a conventional one can be availably applied, thus being economical and including no troublesome constructional working.

In the described embodiment shown in the drawing, the cylinder head 2 is separately constructed and then attached to the front end of the heating cylinder 1, but the cylinder head 2 can be, of course, formed integrally therewith. In addition, the nozzle portion 9 is also integrally formed with the front end of the cylinder head 2, but the nozzle portion 9 can be formed as a separate member so as to be applicable to various types of injection molding operations.

In the illustrated embodiment, although the cylinder head 2 is constructed so as to have an outer diameter smaller than that of the heating cylinder 1, the cylinder head 2 is of course constructed to an outer peripheral surface flat with that of the heating cylinder 1.

Moreover, in general, injection molding products which are obtained with the high precision molding operation have usually small-sizes, so that the reducing of the injection amount caused by reducing the diameter of the cylinder head portion 2 is not considered to be a severe problem for obtaining the products.

These and other advantages of this invention can be obtained by reducing the diameter of the front end screw portion and reducing the inner diameter of the front end portion of the heating cylinder without providing any specific means or device for high pressure injection molding operation.

What is claimed is:

1. An injection molding device comprising a heating cylinder and a cylinder head in which a material to be injected into a mold is fed, screw means disposed in said heating cylinder and cylinder head to feed the material forwardly, and drive means for rotating and reciprocating said screw means, said cylinder head formed at a front end of said heating cylinder, downstream side thereof with respect to the material feed direction, said cylinder head consisting of a first portion continuously formed at the front end of said heating cylinder and having a frustoconical inner surface and a second portion continuously formed at a front end of said first portion of said cylinder head and having an inner diameter smaller than that of said heating cylinder, the inner surfaces of said heating cylinder and said first and second portions of said cylinder head being connected linearly smoothly with each other, said screw means consisting of a first screw portion having an outer diameter smaller than the inner diameter of said heating cylinder, a second screw portion having an outer diameter smaller than the inner diameter of said first portion of said cylinder head, and a third screw portion having an outer diameter smaller than an inner diameter of said second portion of said cylinder head, a longitudinal length of said third screw portion being predetermined such that the front end of said third screw portion remains in said second portion of said cylinder head when said screw means is moved to a backward limit position thereof by said drive means.

2. The injection device according to claim 1 wherein said cylinder head is formed integrally with said heating cylinder.

3. The injection device according to claim 1 wherein said cylinder head is formed as a separate member from said heating cylinder and then secured thereto.

4. The injection device according to claim 1 wherein said first, second and third screw portions are formed integrally.

5. The injection device according to claim 1 wherein said first, second and third screw portions are formed as separate members from each other and then secured respectively.

6. The injection device according to claim 1 wherein a check valve is mounted on said third screw portion for preventing the material from backwardly flowing.

* * * * *